(No Model.)
D. HUSTON.
Self Leveling Berth for Vessels.
No. 234,673. Patented Nov. 23, 1880.
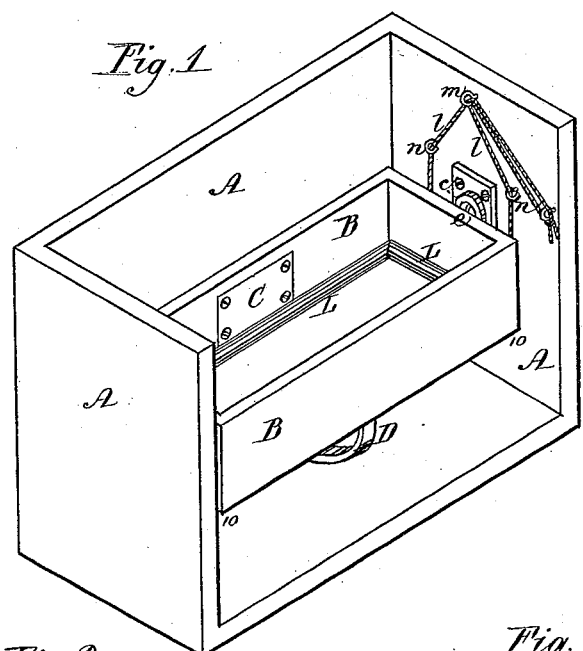
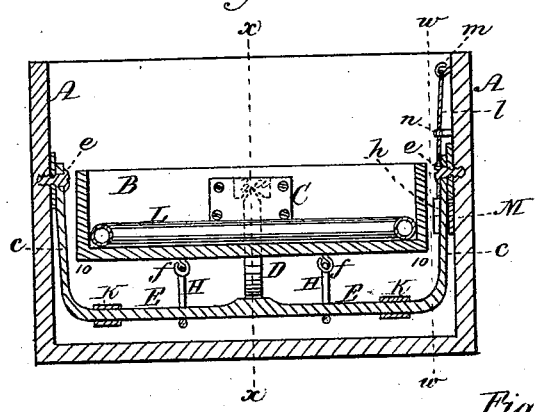
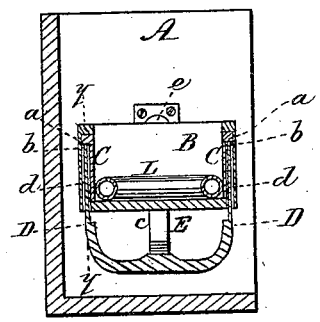
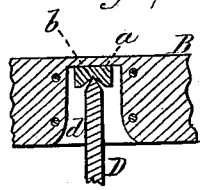
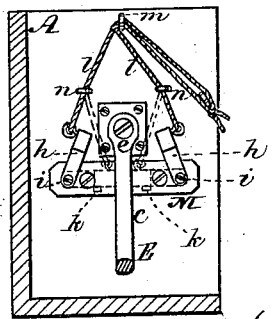
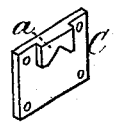
Witnesses,
W. J. Cambridge
Chas. E. Griffin
Inventor,
David Huston
per R. E. Teschemacher
Atty.

UNITED STATES PATENT OFFICE.

DAVID HUSTON, OF BOSTON, MASSACHUSETTS.

SELF-LEVELING BERTH FOR VESSELS.

SPECIFICATION forming part of Letters Patent No. 234,673, dated November 23, 1880.

Application filed July 26, 1880. (No model.)

*To all whom it may concern:*

Be it known that I, DAVID HUSTON, a citizen of the United States, residing at Boston, in the county of Suffolk and State of Massachusetts, have invented certain Improvements in Self-Leveling Berths for Vessels, of which the following is a full, clear, and exact description, reference being had to the accompanying drawings, making part of this specification, in which—

Figure 1 is a perspective view of a self-leveling berth constructed in accordance with my invention. Fig. 2 is a longitudinal vertical section through the center of the same. Fig. 3 is a transverse section on the line $x\ x$ of Fig. 2. Fig. 4 is a vertical section on the line $y\ y$ of Fig. 3. Fig. 5 is a view of one of the socket-plates detached. Fig. 6 is a vertical section on the line $w\ w$ of Fig. 2.

My present invention has for its object to provide a self-leveling berth of simple construction in which no counterpoise-weight is required, and which is so hung that it can be readily lifted off its supports in case of accident and thrown into the water, to serve as a boat or life-preserver; and my invention consists in a removable berth supported on knife-edges at the upper extremities of a pair of arms which are secured to and extend up from a hanging bar arranged longitudinally beneath the center of the berth, and having its ends turned up and pivoted at or near the level of the upper edge of the berth, so that the weight of the occupant will be disposed beneath the pivots, a transversely-oscillating frame being thus provided having side arms, on which the berth is free to vibrate in the direction of its length and from which it can be easily lifted when required, suitable springs being employed, if desired, to prevent undue oscillation and give the necessary stability to the berth, which construction enables the berth to always maintain itself in equilibrium as the vessel pitches or rolls, even in the roughest weather, so that the occupant will enjoy rest and immunity from sea-sickness, which would be unattainable in an ordinary fixed berth.

My invention also consists in certain details of construction, as hereinafter set forth and specifically claimed.

In the said drawings, A represents the state-room or casing within which the berth is located. B is the berth, which is made of rectangular form and of sufficient depth to contain the mattresses, bedding, &c., and has let into it on each side a socket-plate, C, provided with a V-shaped socket or projection, $a$, which rests on a knife-edge, $b$, at the upper extremity of a vertical arm, D, which extends up through an open slot or mortise, $d$, in the side of the berth made to receive it, the slots $d$ being of sufficient length to admit of the free vibration of the berth on the knife-edges. The arms D are united at their lower ends, forming a U-shaped carrier-frame, which is firmly secured at its center to a long hanging bar, E, at or near the center of its length, this bar being arranged longitudinally beneath the center of the berth B, and having its ends $c$ turned up and pivoted at $e\ e$ to the ends of the casing A at or near the level of the upper edge of the berth B, so that the weight of the occupant will be disposed sufficiently far beneath the pivots to render the berth steady as required, the motion of the bar E on its pivots being in a direction at right angles to the motion of the berth upon the knife-edges $b$. The berth B, thus supported upon the knife-edges $b$ of the arms D, is free to vibrate thereon in the direction of its length, or fore and aft, to offset the pitching motion of the vessel, while the hanging frame E D oscillates on its pivots $e\ e$ in a transverse direction, or athwartships, to compensate for or offset the roll of the vessel, and the berth having a universal movement, as described, is thus enabled to preserve its equilibrium or balance and maintain itself in a horizontal position, or nearly so, when occupied, irrespective of the motion of the vessel, even in the roughest weather, thus preventing sea-sickness and insuring repose and opportunity for sleep, whereby the ease and comfort of the passenger are promoted and the liability of his being thrown out of his berth in heavy weather entirely avoided.

The berth B, which is not provided with a counterpoise-weight, is hung so as to be adapted to the preponderance of the weight of the upper portion of the human body, which permits it to balance evenly in the direction of its length when occupied. The necessary stability is given to the berth and the undue oscillation or tipping thereof prevented by means of springs H H, which are attached to the bottom of the berth at $ff$ and to the bar E beneath, these springs being of such power as not to interfere with the free movements of the berth as it swings or vibrates on its transverse axis. Rubber, flat metal, spiral, or other suitable springs may be employed, and the points of attachment of the springs may be changed to suit the requirements of the case.

K K are rubber blocks or cushions which are secured upon the bar E, and serve as buffers for the lower edges, 10, of the berth to strike against, thus limiting its fore-and-aft oscillation and preventing any sudden shock from being communicated to the occupant of the berth in the event of its swinging sufficiently to come into contact with the bar during the movements of the vessel.

The berth B is made light and strong and also water-tight, and as it is not permanently pivoted to its oscillating frame, but merely rests on the upper extremities or knife-edges, $b$, of the vertical arms D, it is evident that in case of accident the berth can be readily detached therefrom by merely raising or lifting it off from its points of support and detaching or cutting the springs H, without removing any nuts, screws, bolts, or other fastening devices, (which is of great importance in an emergency when tools are not at hand,) when it can be thrown overboard and thus be made to serve as a boat or life-preserver; and to give it additional buoyancy when in the water and enable it to easily sustain one or more persons in the water, it is provided on its interior with air cells or receptacles L, formed of rubber, sheet metal, or other suitable material, these cells being so shaped and disposed as not to interfere with the comfort of the occupant or occupy space required for other purposes, and by thus constructing the berth so that it can be used in this manner a very important advantage is gained, as a simple and effectual means of saving life in cases of collision or other accident to the vessel is thus always at hand in a condition for immediate use.

The berth is held immovable and prevented from oscillating or tipping on its longitudinal axis, to facilitate the operation of getting into or out of it, by means of a locking or clutching device consisting of two levers, $h\ h$, pivoted at $i\ i$ to a plate, M, secured to one end of the casing A, these levers, when dropped into a horizontal position, as seen dotted in Fig. 6, resting against stops $k\ k$, with their ends snugly against the opposite sides of the bar E, thus locking it and preventing it from swinging on its pivots $e\ e$, as desired.

The levers $h\ h$ are raised into the position seen in Fig. 6 to release the bar E and allow the berth to swing freely by means of cords $l\ l$, which pass through eyes $m\ n$ and extend down into a position accessible to the occupant of the berth, where they may be secured by a suitable catch or fastening, by which means the levers can be raised and held up out of contact with the bar E while the berth is in use.

The above-described berth is exceedingly simple in its construction and free from liability of breaking or getting out of order, while all frame-work and mechanical devices over the head of the occupant are dispensed with, thus avoiding danger of striking them in getting into or out of the berth.

It is evident that my invention can be applied with advantage to other parts of ships and their furniture, if desired—for instance, to racks for crockery, glassware, &c., tables, chairs, settees, &c., and also to bathing-tubs.

What I claim as my invention, and desire to secure by Letters Patent, is—

1. The plates C, with their sockets or projections $a$ let into the sides of the berth B, in combination with the arms D D, provided with knife-edges $b$, on which the sockets rest, substantially as and for the purpose described.

2. The combination, with the removable berth B, supported on knife-edges at the upper extremities of the arms D D, extending up from the oscillating bar E, arranged longitudinally beneath the center of the berth, of the springs H H, attached to the under side of the berth and to the bar E, and operating substantially in the manner and for the purpose set forth.

3. The combination, with the removable berth B, supported on knife-edges at the upper extremities of the arms D D, extending up from the oscillating bar E, of the locking-levers $h\ h$, pivoted at $i\ i$ and adapted to be dropped into a horizontal position upon stops $k\ k$ to lock the bar E, and be raised to release said bar by cords $l\ l$ passing through eyes $m\ n$ and held by a suitable catch or fastening, all constructed and arranged to operate substantially as described.

Witness my hand this 19th day of July, A. D. 1880.

DAVID HUSTON.

In presence of—
P. E. TESCHEMACHER,
W. J. CAMBRIDGE.